US010951759B2

United States Patent
Mulay et al.

(10) Patent No.: US 10,951,759 B2
(45) Date of Patent: Mar. 16, 2021

(54) SYSTEM AND METHOD TO AUTHENTICATE CONTACT CENTER AGENTS BY A REVERSE AUTHENTICATION PROCEDURE

(71) Applicant: Avaya Inc., Santa Clara, CA (US)

(72) Inventors: Parag Mulay, Pune (IN); Satyam Lad, Pune (IN); Sambhaji Gayake, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/411,344

(22) Filed: May 14, 2019

(65) Prior Publication Data
US 2019/0268469 A1    Aug. 29, 2019

Related U.S. Application Data

(63) Continuation of application No. 14/726,796, filed on Jun. 1, 2015, now Pat. No. 10,341,487.

(51) Int. Cl.
*H04M 3/51*    (2006.01)
*H04M 3/38*    (2006.01)

(52) U.S. Cl.
CPC ......... *H04M 3/5158* (2013.01); *H04M 3/385* (2013.01); *H04M 2203/6045* (2013.01); *H04M 2203/6054* (2013.01)

(58) Field of Classification Search
CPC .................................................. H04M 3/5158
See application file for complete search history.

(56) References Cited

U.S. PATENT DOCUMENTS

| | | | |
|---|---|---|---|
| 5,909,487 A * | 6/1999 | Mainker | H04M 3/48 379/196 |
| 6,324,271 B1 | 11/2001 | Sawyer et al. | |
| 6,327,347 B1 | 12/2001 | Gutzmann | |
| 6,934,858 B2 * | 8/2005 | Woodhill | G06F 21/313 726/5 |
| 7,370,349 B2 | 5/2008 | Holvey et al. | |
| 8,155,280 B1 * | 4/2012 | Or-Bach | H04M 3/493 379/88.13 |
| 8,270,588 B2 | 9/2012 | Schwartz | |
| 8,406,388 B2 * | 3/2013 | Or-Bach | H04M 3/493 379/88.13 |
| 8,467,512 B2 | 6/2013 | Amir et al. | |

(Continued)

OTHER PUBLICATIONS

Phan, Joseph T.; Office Action; U.S. Appl. No. 14/726,796; dated Jun. 30, 2016; U.S. Patent and Trademark Office; Alexandria, VA.

(Continued)

*Primary Examiner* — Peter D Nolan
*Assistant Examiner* — Ce Li Li
(74) *Attorney, Agent, or Firm* — Stevens & Showalter LLP

(57) ABSTRACT

An authentication system to validate the authenticity of call center agents by using a reverse authentication procedure. The authentication system includes a verification module that verifies the authenticity of agents calling from the call center. The verification module retrieves reference answers in response to the user-provided query questions from a media server. The media server may be located inside the enterprise network. These reference questions and their corresponding reference answers are provided by users when registering with the enterprise network.

18 Claims, 10 Drawing Sheets

(56) References Cited

U.S. PATENT DOCUMENTS

| | | | |
|---|---|---|---|
| 8,666,841 B1* | 3/2014 | Claridge | G06Q 20/4016 |
| | | | 705/26.35 |
| 9,001,977 B1* | 4/2015 | Ramalingam | H04M 3/385 |
| | | | 379/142.05 |
| 9,521,141 B2* | 12/2016 | Pillay | H04L 63/083 |
| 9,549,062 B1 | 1/2017 | Yaung et al. | |
| 2005/0132060 A1 | 6/2005 | Mo et al. | |
| 2006/0095766 A1 | 5/2006 | Zhu et al. | |
| 2008/0082821 A1* | 4/2008 | Pritikin | H04L 63/1483 |
| | | | 713/169 |
| 2008/0189212 A1 | 8/2008 | Kulakowski et al. | |
| 2009/0190735 A1* | 7/2009 | Gilmartin | B60R 16/0373 |
| | | | 379/201.12 |
| 2010/0014647 A1 | 1/2010 | Subramaniam | |
| 2013/0022181 A1* | 1/2013 | Or-Bach | H04M 3/493 |
| | | | 379/88.11 |
| 2015/0032624 A1* | 1/2015 | Claridge | G06Q 20/4016 |
| | | | 705/44 |
| 2015/0229631 A1* | 8/2015 | Pillay | H04L 63/083 |
| | | | 726/4 |
| 2016/0028724 A1* | 1/2016 | Gillett | H04L 63/0861 |
| | | | 726/7 |
| 2016/0352894 A1 | 12/2016 | Mulay et al. | |
| 2017/0061968 A1* | 3/2017 | Dalmasso | G10L 17/08 |
| 2018/0075454 A1* | 3/2018 | Claridge | G06Q 20/4016 |

OTHER PUBLICATIONS

Phan, Joseph T.; Final Office Action; U.S. Appl. No. 14/726,796; dated Feb. 1, 2017; U.S. Patent and Trademark Office; Alexandria, VA.

Phan, Joseph T.; Office Action; U.S. Appl. No. 14/726,796; dated Dec. 14, 2017; U.S. Patent and Trademark Office; Alexandria, VA.

Phan, Joseph T.; Notice of Allowance; U.S. Appl. No. 14/726,796; dated Feb. 15, 2019; U.S. Patent and Trademark Office; Alexandria, VA.

* cited by examiner

SYSTEM AND METHOD TO AUTHENTICATE CONTACT CENTER AGENTS BY A REVERSE AUTHENTICATION PROCEDURE

CROSS REFERENCE TO RELATED APPLICATION

This application is a continuation of and claims priority to U.S. patent application Ser. No. 14/726,796, filed Jun. 1, 2015, entitled "SYSTEM AND METHOD TO AUTHENTICATE CONTACT CENTER AGENTS BY A REVERSE AUTHENTICATION PROCEDURE," the entire disclosure of which is incorporated by reference herein.

BACKGROUND

Field

Embodiments of the present invention generally relate to a system and method to authenticate contact center agents of an enterprise and particularly to a system and method to authenticate contact center agents by a reverse authentication procedure.

Description of Related Art

Contact centers are employed by many enterprises to service inbound and outbound contacts from customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of calls/contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice calls, video calls, emails, etc.).

In today's communicatively connected world, the massive growth in information has been the key to the sustainable growth of the human race. To keep this sustainable growth intact, security of the information transferring from one point to another point holds primal importance. These days, hackers continuously try to steal crucial information from various enterprises such as financial institutions, insurance companies, health care service providers, consumer goods companies and so on. The modus operandi of these peoples are simple which is they pose as fake contact center agents on behalf of these enterprises, gather somehow some very basic information about the account holders who are having any kind of accounts at those enterprises and then trick those unsuspecting users to divulge a plurality of crucial personal information about themselves. Most of the times peoples who receive such calls from these fake agents do not have any way to verify the authenticity of the callers.

Further, to reduce costs of operating a contact center on their own, many enterprises outsource the responsibilities of running contact centers with smaller firms. In this way, a plurality of crucial user-related information is shared with many other people, some of whom may have ill intent. Due to this, users may also be hesitant to disclose their crucial personal information, which in turn may hamper the overall functionality of the contact center. In the initial five months of 2014, some of the United Kingdom's (UK's) top financial institutions have reported a combined loss of over £21 million due to multiple phishing attacks. Phishing attacks are the most common fraud attack in today's financial world, in which fake people pose as contact center agents of a financial institution, contact unsuspecting users having accounts with those financial institutions and trick those users to divulge their personal information. According to another statistic, for every 2000 phishing attacks, every person on an average loses more than £10,000.

Common conventional techniques to detect financial fraud include: verifying the caller by installing calling line identification (CLI); periodically receiving feeds from service providers; installing an app on a smartphone that can detect a bogus caller. Though each of these disclosed techniques may help to differentiate between an original contact center agent and a bogus agent, they are still not fully fraud proof. For example, hackers may easily hide their bogus calling numbers even from CLI or true caller so that they cannot be detected by those techniques. None of the current conventional techniques provide an approach by which a person who is receiving such a call from a bogus agent actually can validate the authenticity of the callers.

Thus, there is a need for a system and method to validate the authenticity of contact center agents to eliminate the risks of fraud.

SUMMARY

Embodiments in accordance with the present invention provide a system to authenticate the identities of the contact center agents. The authentication system maybe located inside a contact center server. The system includes a verification module configured to provide reference answers to at least one reference question asked by the user to validate the authenticity of the contact center agent. The user may provide the reference questions and their corresponding reference answers while registering with the enterprise network, and the reference questions and their corresponding reference answers are stored in a media server. The verification module fetches the reference answers from the media server and provides them to the user. A reference answer may also be referred to herein as a pre-recorded secret authentication message. "Secret" as used throughout herein may refer to something that is kept private and is known and/or verifiable only by an intended person. For example, a secret authentication message would be a message that only an intended person would know and can verify (e.g., because that person supplied the message).

Embodiments in accordance with the present invention further provide a computer-implemented method for authenticating identities of agents of an enterprise contact center. The method includes playing a pre-recorded secret authentication message to the user before initiating a conversation; verification done by the user about the authenticity of the caller after hearing the pre-recorded secret authentication message; and accepting the agent generated outbound call from the enterprise call center associated with the enterprise network by the user.

Embodiments in accordance with the present invention further provide a computer-implemented method for authenticating identities of agents of an enterprise contact center. The method includes playing a pre-recorded secret authentication message to the user before initiating a conversation wherein the pre-recorded secret authentication message may be generated by the user itself during registration with the enterprise network; verification done by the user about the authenticity of the caller after hearing the pre-recorded secret authentication message; and accepting the agent generated outbound call from the enterprise call center associated with the enterprise network by the user.

Embodiments of the present invention may provide a number of advantages depending on its particular configuration. The present application provides a system and a method to authenticate contact center agents by a reverse authentication procedure. The present application further provides two options for the reverse authentication procedure for the users to authenticate the calling agents. The first option is listening to a pre-recorded secret authentication message that was recorded and stored in an enterprise server by the user itself while registering with the enterprise network. The second option is to ask questions and retrieve the correct answers from the contact center, in which the questions and answers were recorded by the user when registering with the enterprise network. Further, the present application utilizes reverse authentication procedures to reduce the risk of receiving fraudulent calls from imposters posing as contact center agents and trying to steal information from unsuspecting people.

These and other advantages will be apparent from the present application of the embodiments described herein.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
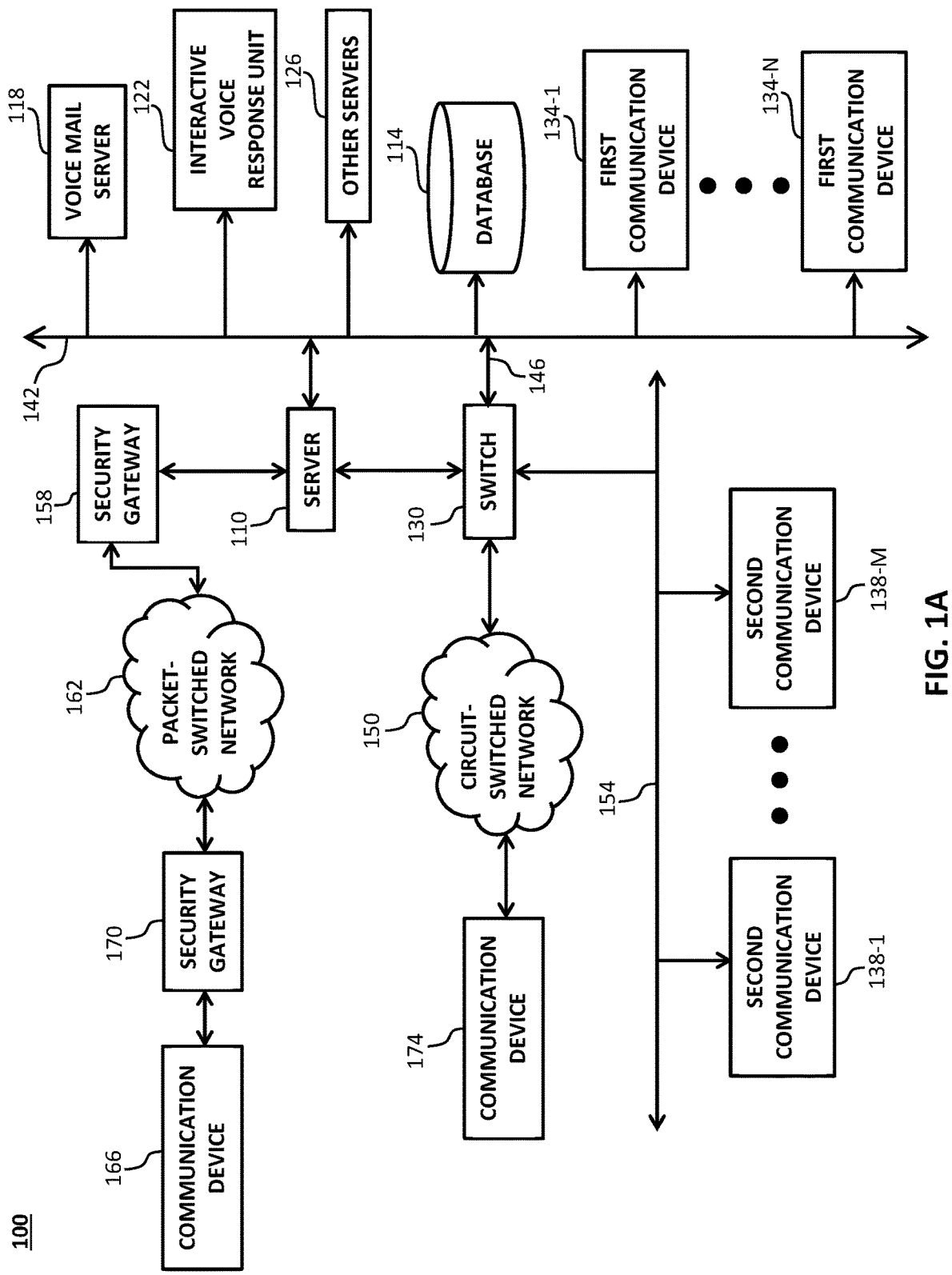
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, or enable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; energizing a circuit that performs the function (e.g., providing power to a transceiver circuit in order to receive data); and so forth.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be a G700 Media Gateway™ from Avaya Inc., or may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™ S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the 4600 Series IP Phones™ from Avaya, Inc., IP softphones such as an IP Softphone™ from Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
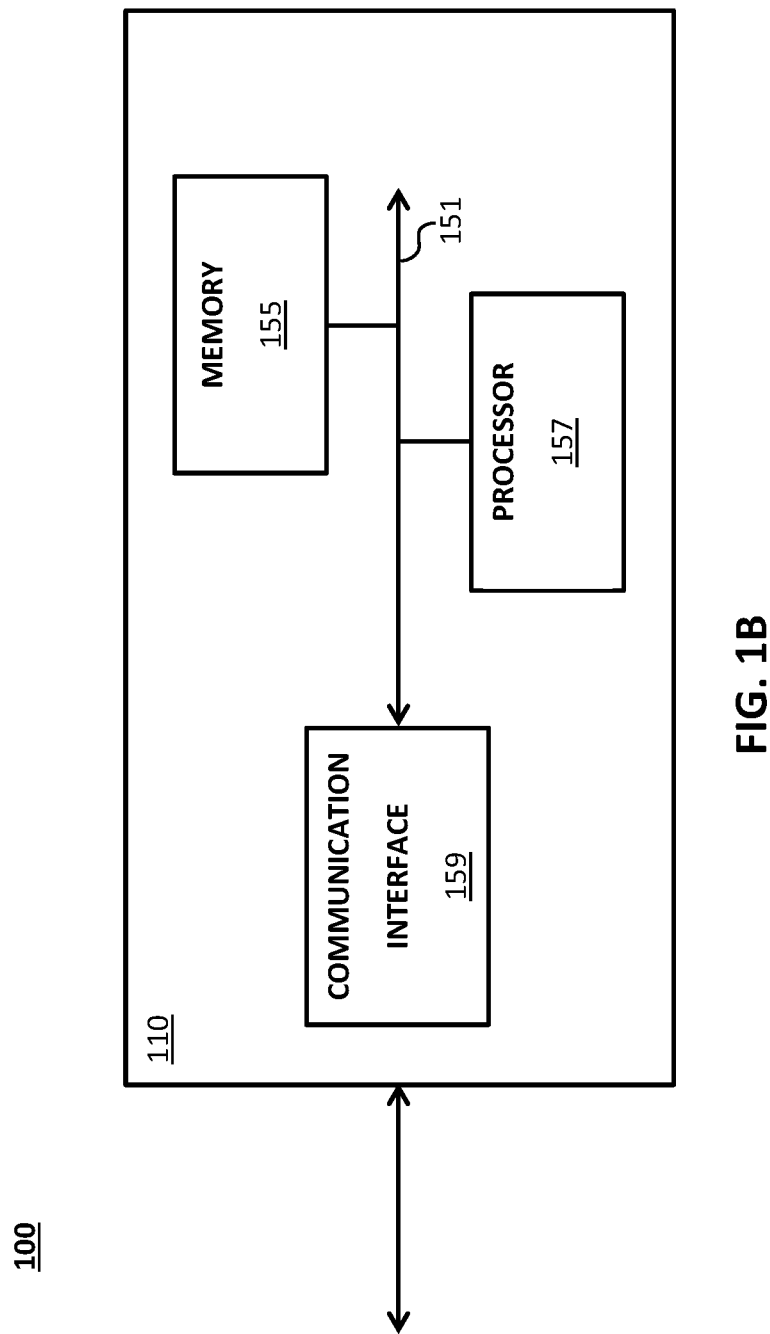
FIG. 1B illustrates a high level hardware abstraction of a block diagram of a server, according to an embodiment of the present invention.

FIG. 1B illustrates at a relatively high-level hardware abstraction a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood that the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
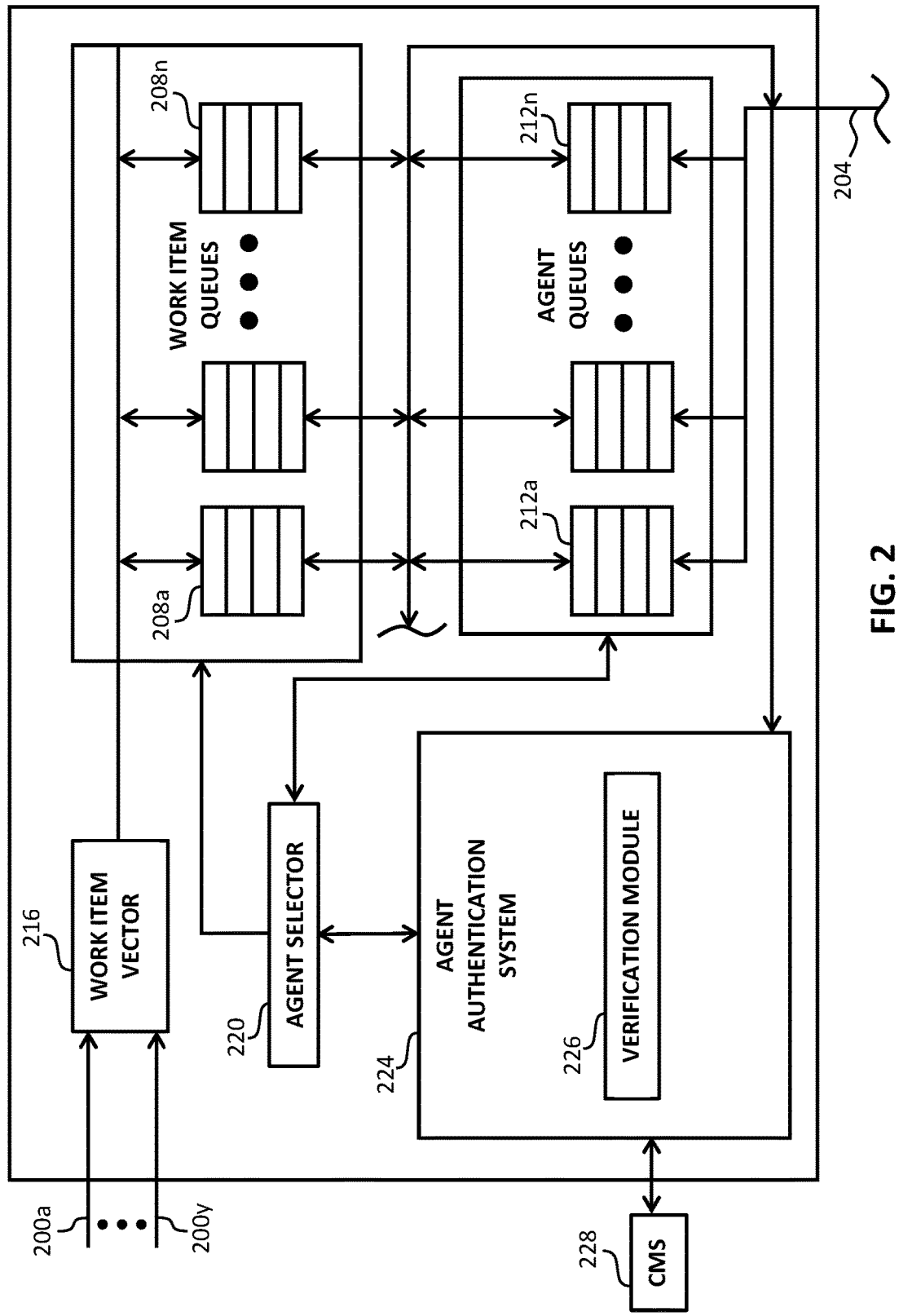
FIG. 2 illustrates a functional block diagram of the server that may be used in the contact center, according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers profile of agents of the contact center and monitors current status of the agents and parameters of the received work requests. OA and CMS will hereinafter be referred to jointly as CMS 228.

As can be seen in FIG. 2, included among the data stored in the server 110 is a set of contact queues or work request queues 208a-n and a separate set of agent queues 212a-n. Each work request queue 208a-n corresponds to a different set of agent queues, as does each agent queue 212a-n. Conventionally, a contact is prioritized and either is enqueued in individual ones of the contact queues 208a-n in their order of priority or is enqueued in different ones of a plurality of contact queues 208a-n that correspond to a different priority. Likewise, each agent's queue 212a-n is prioritized according to his or her level of expertise or skill in that queue, and an agent is either enqueued in one of an individual agent queues 212a-n in their order of expertise level, or is enqueued in a different one of a plurality of agent queues 212a-n that correspond to a queue, and each queue corresponds to a different expertise level.

Included among the control programs in the server 110 is a work request vector 216. Contacts incoming to the contact center are assigned by the work request vector 216 to different work request queues 208a-n based upon a number of predetermined criteria, including customer identity, customer needs, contact center needs, current contact center queue lengths, customer value, and the agent skill that is required for the proper handling of the contact. Agents who are available for handling work requests are assigned to the agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the work request queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Further, embodiments in accordance with the present invention may include, among the programs executing on the server 110, an agent selector 220 and an agent authentication system 224. The agent selector 220 and the agent authentication system 224 are stored either in the main memory or in a peripheral memory (e.g., disk, CD ROM, etc.) or some other computer-readable medium of the contact center 100. Further, the agent selector 220 monitors the occupants of the work item and agent queues 208a-n and 212a-n, respectively, and contact center objectives, rules, and policies and assigns agents to service work items.

The agent selector 220 distributes and connects these work items to communication devices of available agents based on the predetermined criteria noted above. When the agent selector 220 forwards a contact (or first work item) to an agent, the agent selector 220 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 220.

According to an embodiment of the present invention, the agent authentication system 224 is configured to validate the authenticity of the calling agents. The agent authentication system 224 includes a certain module, such as, but is not restricted to, a verification module 226. In some embodiments, the verification module 226 may be implemented by one or more software processes running on the server 110. The server 110 may implement one or more software processes by use of the processor 157 being suitably programmed by use of software instructions stored in the memory 155 coupled to the processor 157.

The verification module 226 may validate the authenticity of the agents of the contact center 100 according to an embodiment of the present invention. The type of the call, i.e., whether the call made by an agent is a voice call, a video call, a text message, an email, an instant messaging, a Voice over Internet Protocol (VoIP), and so forth.

Figure 3:
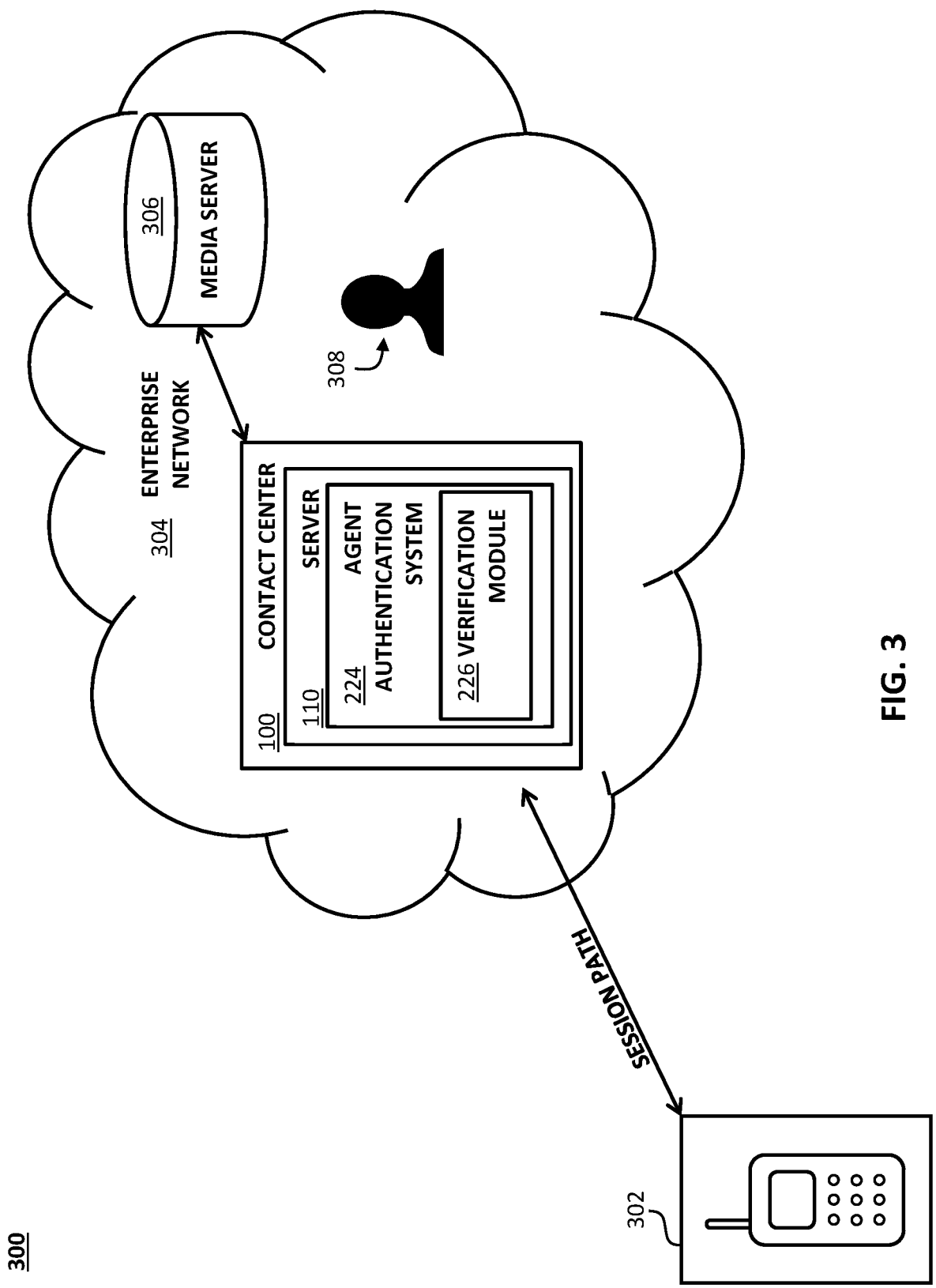
FIG. 3 illustrates a flowchart of forming a communication session path between a user, a contact center and a media server when both the contact center server and the media server are located inside an enterprise network, according to an embodiment of the present invention.

According to an embodiment of the present invention, FIG. 3 illustrates a representation about a possible implementation scenario of forming a communication session path in between a user 302, a contact center 100 which includes a server 110, a contact center agent 308 and a media server 306. The contact center 100, the contact center agent 308 and the media server 306 may all be located inside an enterprise network 304. The server 110 may include an agent authentication system 224 where the agent authentication system 224 may also include a verification module 226.

During registration with the enterprise network 304, the user 302 may record a secret authentication message, which may also be referred to as a reference message. Further, the user 302 may also record at least one security question and its corresponding answer. The corresponding answer may also be referred to as a reference answer. The enterprise network 304 may store in the media server 306 information related to user 302 along with the secret authentication message and the security questions and their answers.

When the user 302 receives a call from the contact center agent 308 of the contact center 100, the server 110 automatically fetches the pre-recorded secret authentication message from the media server 306 and plays it for the user 302 to hear. After hearing the pre-recorded secret authentication message, which the server 110 played for the user 302, the user 302 is more assured that the contact center agent 308 who is calling on behalf of the enterprise network 304 is genuine. After verification, the user 302 may accept the call received from the contact center agent 308 and continue discussion. The details of the call may include, a type of call, i.e., whether the call received by the user 302 from the agent 308 is a voice call, a video call, a text message, an email, an instant message, a Voice over Internet Protocol (VoIP), and so forth.

Assuming user 302 recorded at least one security question and its related answer, and that they were saved in media server 306, contact center 100 may route the call to verification module 226, either automatically or on request of user 302. Verification module 226 is located inside agent authentication system 224. During verification, user 302 may ask a pre-recorded question, which is routed to verification module 226. Verification module 226 may fetch the corresponding pre-recorded answer from media server 306 and provide the pre-recorded answer back to user 302. If user 302 hears the expected answer, user 302 will be more assured that contact center agent 308 is an agent representing enterprise network 304.

The recorded secret authentication message provided by user 302 during registration may at least be one of a secret phrase or a secret number. User 302 may enter the secret phrase or the secret number during registration with the enterprise network 304 at least by a text message or a voice message.

If the recorded secret authentication message is a voice message, the agent authentication system 224 located inside the server 110 may fetch the voice message and delivers it to the user 302. If the secret authentication is a text message, then the agent authentication system 224 may fetch the text messages, converts the text message to speech messages and then deliver them to the user 302 for the authentication purpose.

Figure 4:
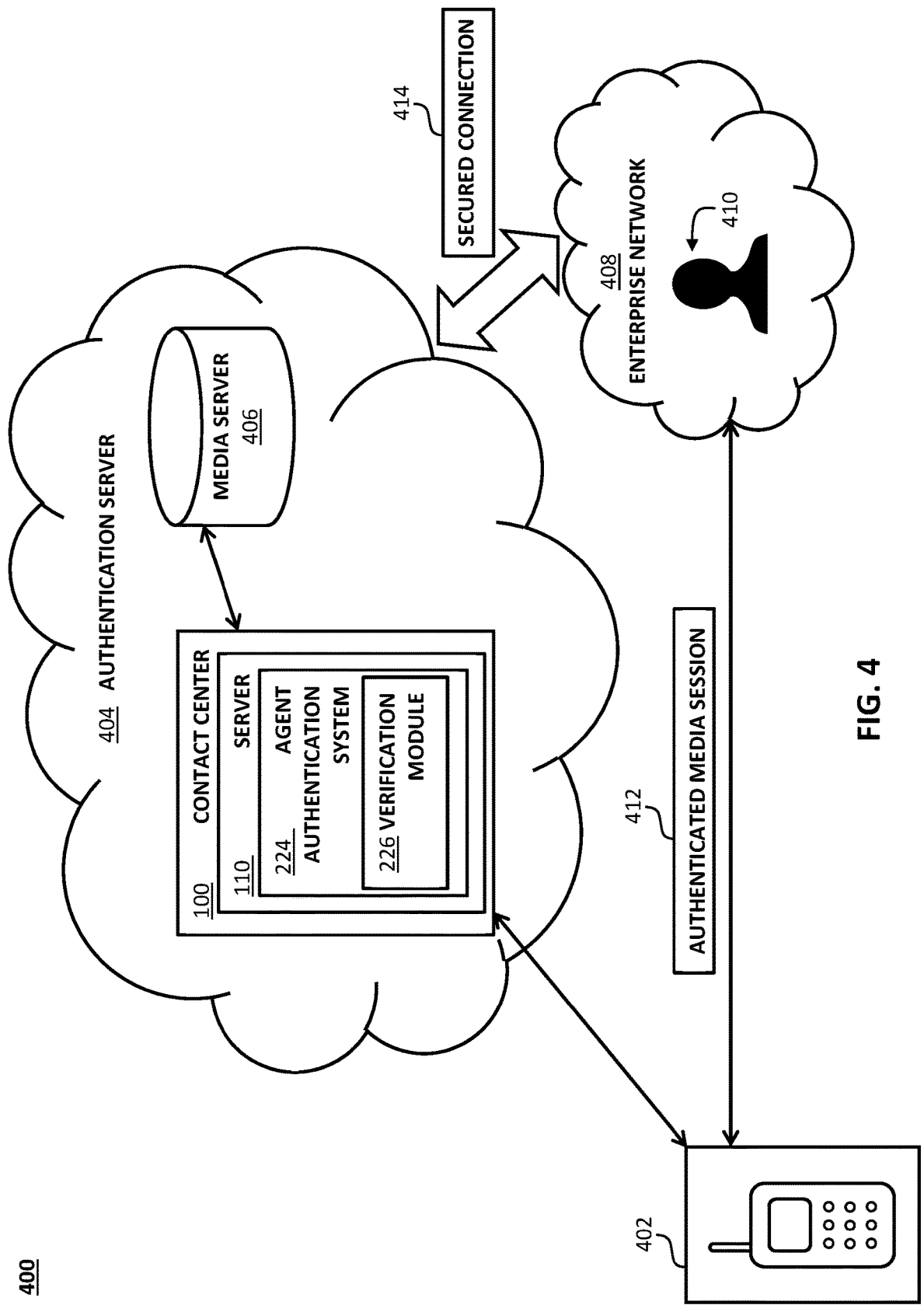
FIG. 4 illustrates a flowchart of forming a communication session path between a user, a contact center and a media server when both the contact center and the media server are located in an authentication server that is separate from the enterprise network, according to an embodiment of the present invention.

According to an embodiment of the present invention, FIG. 4 illustrates a representation about a possible implementation scenario of forming a communication session path in between a user 402, a contact center 100 which may include a server 110, a contact center agent 410 and a media server 406. The contact center 100 and the media server 406 may be located in a separate authentication server 404. The authentication server 404 may be controlled by a separate agency that provides authentication services. The contact center agent 410 may be located inside an enterprise network 408. The enterprise network 408 may have outsourced the authentication service provisioning to the separate agency that maintains the authentication server 404. The server 110 may include an agent authentication system 224 where the agent authentication system 224 may also include a verification module 226.

During registration with the enterprise network 408, the user 402 may record a secret authentication message, which may also be referred to as a reference message. Further, the user 402 may also record at least one security question and its corresponding answer. The corresponding answer may also be referred to as a reference answer. The enterprise network 408 may store in the media server 406 information related to user 402 along with the secret authentication message and the security questions and their answers. Media server 406 may be located in the separate authentication server 404 governed by the separate agency. The enterprise network 408 may form a secured connection with the authentication server 404 to access information related to user 402 along with the secret authentication message and the security questions and their answers. After forming the secured connection with the authentication server 404, the enterprise network 410 may route all calls with the user 402 through the authentication server 404.

When the user 402 receives a call from the contact center agent 410 of the contact center 100, the server 110 may automatically fetch the pre-recorded secret authentication message from the media server 406 and plays it for the user 402 to hear. After hearing the pre-recorded secret authentication message, the user 402 is more assured that the contact center agent 410 who is calling on behalf of the enterprise network 408 is genuine. After verification, the user 402 may accept the call received from the contact center agent 410 and an authenticated media session starts between the user 402 and the contact center agent 410. The details of the call may include, a type of call, i.e., whether the call received by the user 302 from the agent 308 is a voice call, a video call, a text message, an email, an instant message, a Voice over Internet Protocol (VoIP), and so forth.

During verification, contact center 100, either on the request of the user 402 or automatically, may route the call towards the verification module 226 which is located inside the agent authentication system 224. The user 402 may ask at least one of those pre-recorded questions to the verification module 226. The verification module 226 may fetch the corresponding pre-recorded answers from the media server 406 and provide them back to the user 402. After hearing the appropriate answers to the asked questions the user 402 may become more assured sure that the contact center agent 410 is a genuine agent representing the enterprise network 408.

The user 402 recorded secret authentication message during registration with the enterprise network 410 may at least be one of a secret phrase or a secret number. The user 402 may enter the secret phrase or the secret number during registration with the enterprise network 408 at least by a text message or a voice message.

If the recorded secret authentication message is a voice message, the agent authentication system 224 located inside the server 110 of the contact center 100 fetches the voice message and delivers it to the user 402. If the recorded secret authentication is a text message, then the agent authentication system 224 may convert the text message to a speech message and delivers the speech message back to the user 402 for the authentication purpose.

Figure 5:
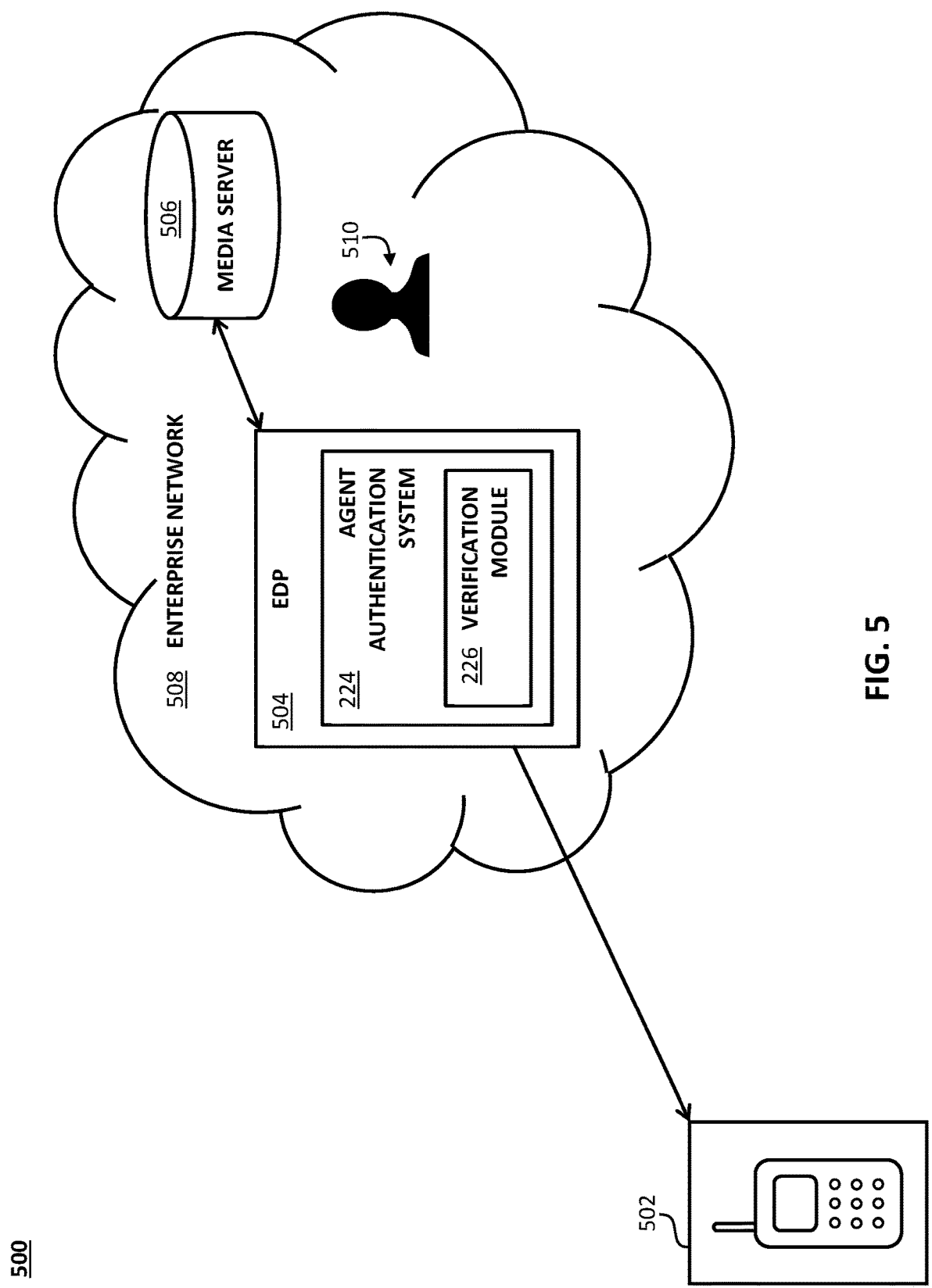
FIG. 5 illustrates an alternative architectural representations to form a communication session path between a user, an Engagement Development Platform (EDP) and a media server when both the EDP and the media server are located inside an enterprise network, according to an embodiment of the present invention.

According to an embodiment of the present invention, FIG. 5 illustrates an alternative architectural representations to form a communication session path between a user 502, an EDP 504, a media server 506 and a calling agent 510, when the EDP 504, the media server 506 and the calling agent 510 all are located inside an enterprise network 508, according to an embodiment of the present invention. EDP 504 may integrate existing and new applications with any unified communication technology setup having contact center 100 capabilities, which may include voice, video, text and email communications. The EDP 504 may also include an agent authentication system 224 where the agent authentication system 224 may also include a verification module 226.

During registration with the enterprise network 508, the user 502 may record a secret authentication message, which may also be referred to as a reference message. Further, the user 502 may also record at least one security question and its corresponding answer. The corresponding answer may also be referred to as a reference answer. The enterprise network 508 may store in the media server 506 information related to user 502 along with the secret authentication message and the security questions and their answers.

When the user 502 receives a call from the contact calling agent 510 of the contact center 100, the EDP 504 may automatically fetch the pre-recorded secret authentication message from the media server 506 and play it for the user 502 to hear. After hearing the pre-recorded secret authentication message, the user 502 is more assured that the calling agent 510 who is calling on behalf of the enterprise network 508 is genuine. After verification, the user 502 may accept the call received from the calling agent 510 and continue discussion. The details of the call may include, a type of call, i.e., whether the call received by the user 502 from the agent 510 is a voice call, a video call, a text message, an email, an instant message, a Voice over Internet Protocol (VoIP), and so forth.

During verification, EDP 504, either automatically or on the request of the user 502, may route the call towards the verification module 226, which is located inside the agent authentication system 224. The user 502 may ask at least one those pre-recorded questions to the verification module 226.

The verification module 226 may fetch the corresponding pre-recorded answers from the media server 506 and provide them back to the user 502. After hearing the pre-recorded answers, user 502 may be more assured that the calling agent 510 is genuine and may continue the conversation.

The secret authentication message recorded by user 502 during registration with the enterprise network 508 may at least be one of a secret phrase or a secret number. The user 502 may enter the secret phrase or the secret number during registration with the enterprise network 508 at least by a text message or a voice message.

If the secret authentication message is a voice message, the agent authentication system 224 located inside the EDP 504 may fetch the voice message and delivers it to the user 502. If the secret authentication message is a text message, then the agent authentication system 224 may convert the text messages to speech messages and delivers them back to the user 502 for the authentication purpose.

Figure 6:
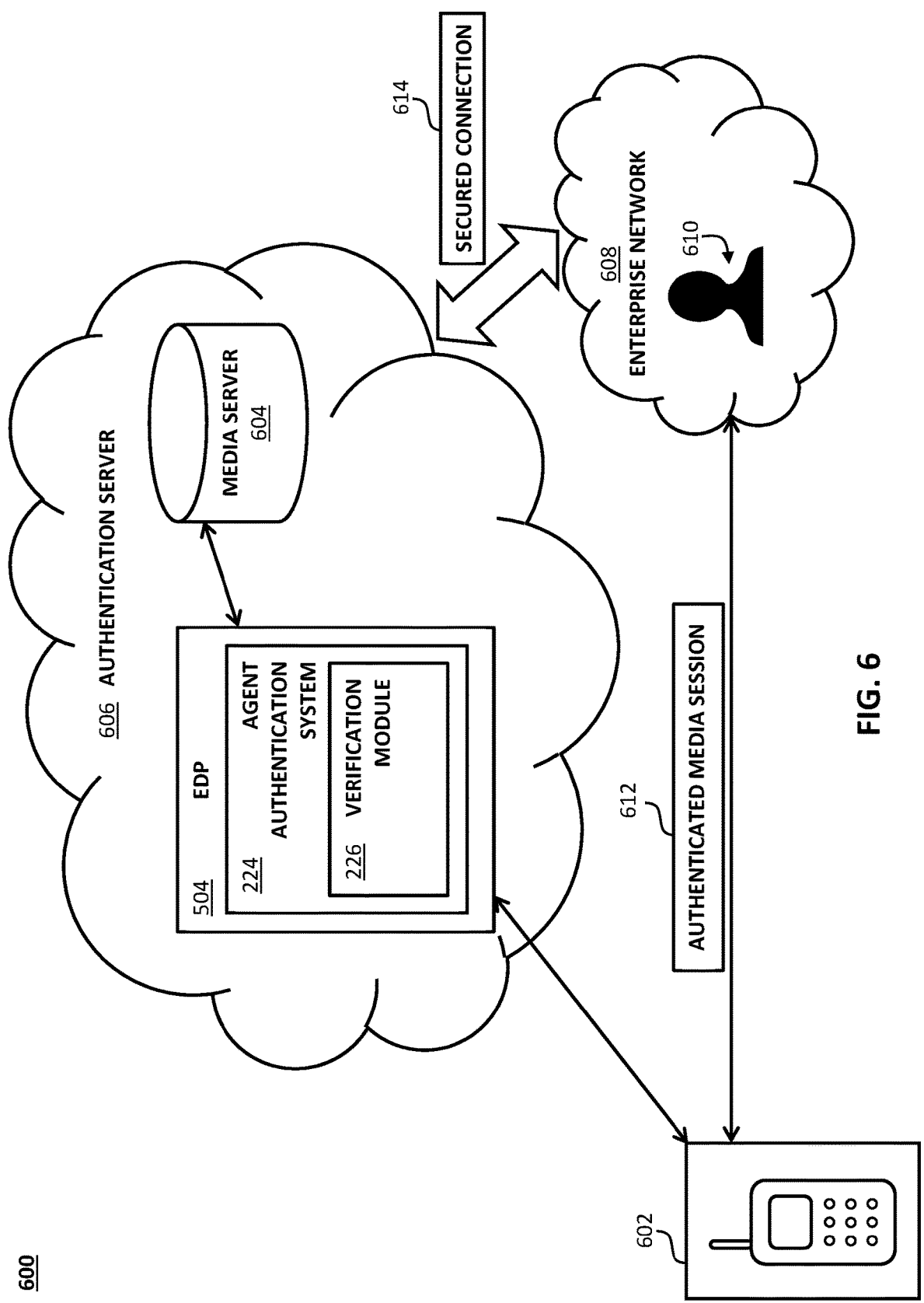
FIG. 6 illustrates an alternative architectural representation to form a communication session path between a user, an EDP and a media server when both the EDP and the media server are located in an authentication server which is separate from the enterprise network, according to an embodiment of the present invention.

According to an embodiment of the present invention, FIG. 6 illustrates an alternative architectural representation to form a communication session path between a user 602, an EDP 504, a media server 604 and a calling agent 610. EDP 504 and the media server 604 are located inside an authentication server 606, which may be separate from an enterprise network 608. The authentication server 606 may be controlled by a separate agency that provides authentication services. The calling agent 610 may be located inside the enterprise network 608. The enterprise network 608 may have outsourced the authentication service provisioning to the separate agency that maintains the authentication server 606. The EDP 504 may include an agent authentication system 224 where the agent authentication system 224 may also include a verification module 226.

During registration with the enterprise network 608, the user 602 may record a secret authentication message, which may also be referred to as a reference message. Further, the user 602 may also record at least one security question and its corresponding answer. The corresponding answer may also be referred to as a reference answer. The enterprise network 608 may store in the media server 604 information related to user 602 along with the secret authentication message and the security questions and their answers. Media server 604 may be located in the separate authentication server 606 governed by the separate agency. The enterprise network 608 may form a secured connection with the authentication server 606 to access information related to user 602 along with the pre-recorded secret authentication message and the security questions and their answers. After forming the secured connection with the authentication server 606, the enterprise network 608 may route all calls with the user 602 through the authentication server 606.

When the user 602 receives a call from the calling agent 610 of the enterprise network 608, the EDP 504 may automatically fetch the pre-recorded secret authentication message from the media server 604 and plays it for the user 602 to hear. After hearing the pre-recorded secret authentication message, the user 602 is more assured that the calling agent 610 who is calling on behalf of the enterprise network 608 is genuine. After verification, the user 602 may accept the call received from the calling agent 610 and an authenticated media session starts between the user 602 and the calling agent 610. The details of the call may include, a type of call, i.e., whether the call received by the user 602 from the agent 610 is a voice call, a video call, a text message, an email, an instant message, a Voice over Internet Protocol (VoIP), and so forth.

During verification, EDP 504, either automatically or on the request of the user 602, may route the call to verification module 226 inside the agent authentication system 224. The user 602 may ask a pre-recorded question to the verification module 226. The verification module 226 may fetch the corresponding pre-recorded answer from the media server 604 and provide the answer back to the user 602. After hearing the pre-recorded answer, the user 602 may be more assured that the calling agent 610 is a genuine agent representing the enterprise network 608.

The secret authentication message recorded by user 602 during registration may at least be one of a secret phrase or a secret number. The user 602 may enter the secret phrase or the secret number during registration with the enterprise network 608 at least by a text message or a voice message.

If secret authentication message is a voice message, the agent authentication system 224 located inside the EDP 504 may fetch the voice message and delivers it to the user 602. If the secret authentication message is a text message, then the agent authentication system 224 may convert the text message to a speech message and delivers them back to the user 602 for the authentication purpose.

Figure 7:
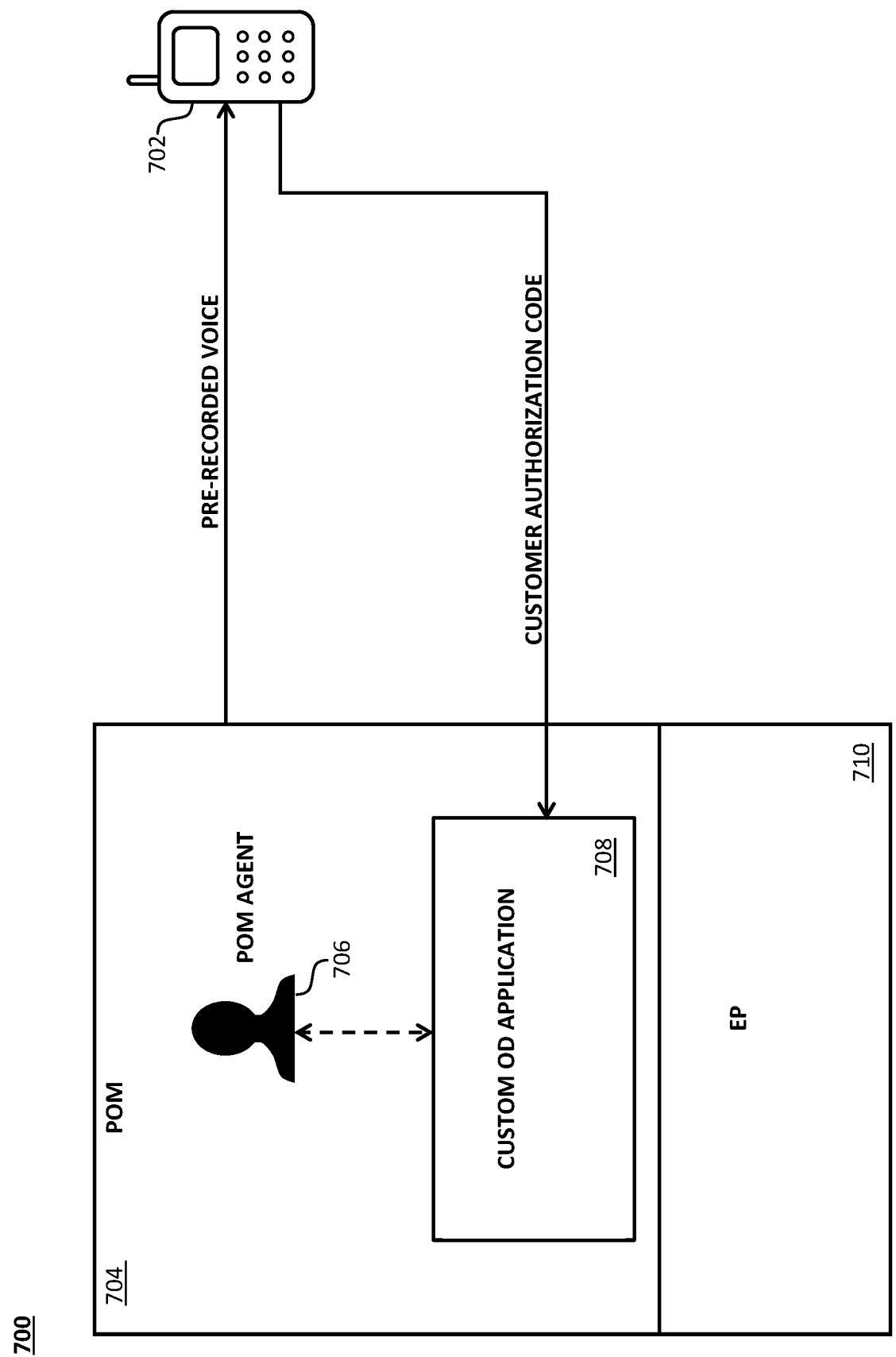
FIG. 7 illustrates an alternative approach to form a communication session path between a user and a Proactive Outreach Manager (POM), according to an embodiment of the present invention.

According to an embodiment of the present invention, FIG. 7 illustrates an alternative implementation of the current invention on a POM 704, according to an embodiment of the present invention.

POM 704 is a software which may initiate an outbound call towards a customer 702 and when the customer 702 answers the outbound call, POM 704 may connect the customer 702 with a POM Agent 706.

Figure 8:
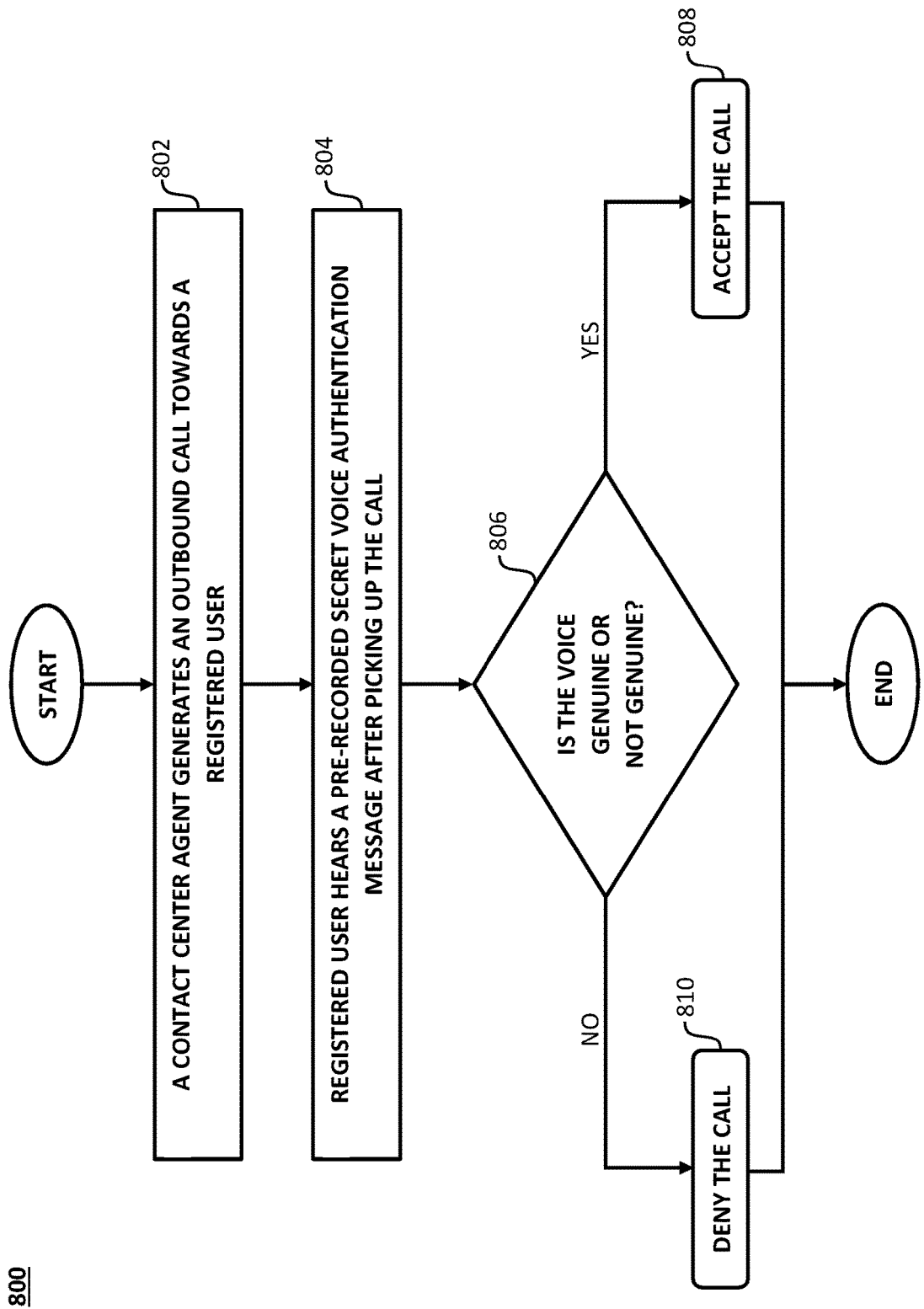
FIG. 8 depicts a flow chart of a method for managing a communication session in the contact center, according to an embodiment of the present invention.

FIG. 8 depicts a flowchart of a method 800 for managing a communication session in the contact center 100, according to an embodiment of the present invention.

At step 802, an agent of the contact center 100 may generate an outbound call towards a user who is registered with the enterprise, which the contact center is representing. In one embodiment of the present invention, the user while registering with the enterprise network may record a secret authentication message, which may be stored in a media server of the enterprise network. The user may also record at least one security question and its relevant answer where both the security question and the answer also may be stored in the enterprise media server. The contact center server may also include an agent authentication system, which may include a verification module. The stored secret authentication message may at least be a secret phrase or a secret number. The user may store the secret phrase or the secret number at least by a text message or a voice message.

At step 804, when the user picks up the call, the contact center server may fetch the stored secret authentication message from the enterprise media server and plays to the user. If the secret authentication message was stored as a text message, the agent authentication system may convert the text message to a voice message and delivers it to the user.

At step 806, the user decides if the secret voice authentication message is genuine or not.

At step 808, if the recorded voice is genuine the user accepts the call from the agents and continues the communication.

At step 810, if the recorded voice is not genuine the user denies the incoming call.

Figure 9:
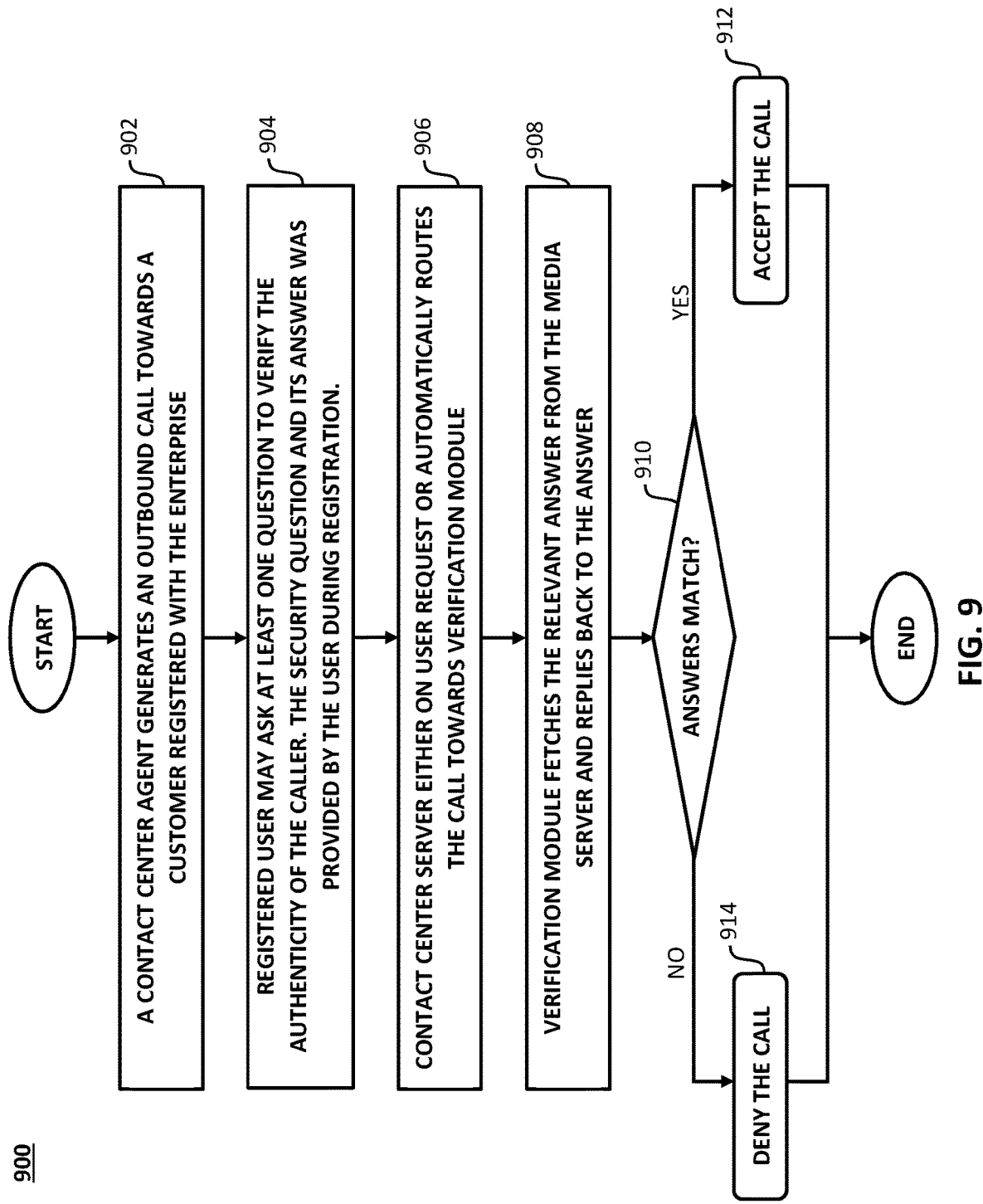
FIG. 9 depicts a flow chart for managing a communication session in the contact center, according to another embodiment of the present invention.

FIG. 9 depicts a flowchart of a method 900 for managing a communication session in the contact center 100, according to another embodiment of the present invention.

At step 902, an agent of the contact center 100 may generate an outbound call towards a user who is registered with the enterprise, which the contact center is representing.

In one embodiment of the present invention, the user may also record at least one security question and its relevant answer where both the security question and the answer also may be stored in the enterprise media server.

At step 904, the user decides to ask at least one security question to the contact center to verify the authenticity of the contact center agent.

At step 906, the contact center server, either automatically or based on user request, routes the call to the verification module.

At step 908, the verification module fetches the appropriate reply from the media server and replies back to the user.

At step 910, the user decides if the reply matches.

At step 912, if the reply matches then the user accepts the call.

At step 914, if the reply does not match then the user denies the call.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method to verify authenticity of a resource placing a call from an entity associated with an enterprise network to a registered user of the enterprise network, the method comprising:
   receiving, by a server associated with the enterprise network, following receipt of the call by the registered user, a question from the registered user;
   matching, by the server, the question to one of a plurality of security questions to produce a matched question;
   fetching, by the server, a reference answer corresponding to the matched question;
   providing, by the server, to the registered user, the reference answer corresponding to the matched question, wherein the question from the registered user, the plurality of security questions, and the reference answer are kept secret from the resource;
   after the reference answer is provided to the registered user, receiving, by the server, a notification of acceptance of the call from the registered user; and
   following receipt of the notification of acceptance, starting, by the server, a communication session between the registered user and the resource.

2. The method of claim 1, further comprising:
   accepting, by the server, the plurality of security questions and a plurality of reference answers from the registered user during registration with the enterprise network.

3. The method of claim 1, further comprising:
   storing, by the server, additional information related to the registered user in a media server associated with the enterprise network.

4. The method of claim 1, wherein the plurality of security questions and the reference answer are stored in a media server associated with the enterprise network and wherein the media server is located in a separate authentication server that is separate from the enterprise network.

5. The method of claim 4, further comprising:
   forming, by the enterprise network, a secured connection with the separate authentication server to access the security questions and the reference answer.

6. The method of claim 4, wherein the call is routed through the separate authentication server via the secured connection.

7. The method of claim 4, further comprising:
   storing, by the server, additional information related to the registered user in the media server, wherein the additional information is accessible via the secured connection.

8. The method of claim 1, wherein the plurality of security questions and the reference answer are stored in a media server associated with the enterprise network and wherein the media server is located inside the enterprise network.

9. The method of claim 1, further comprising:
   prior to receiving the question from the registered user, receiving, by the server, a request from the registered user to verify the authenticity of the resource placing the call.

10. The method of claim 1 further comprising:
    upon receipt of the call by the registered user and prior to receiving the question from the registered user, automatically routing, by the server, the call to an agent authentication system.

11. A system to verify authenticity of a resource placing a call from an entity associated with an enterprise network to a registered user of the enterprise network, the system comprising:
    a server comprising a processor, wherein the server is associated with the enterprise network; and
    a storage device, in communication with the processor, storing executable instructions, wherein the processor when executing the executable instructions:
    following receipt of the call by the registered user, receives a question from the registered user;
    matches the question to one of a plurality of security questions to produce a matched question;
    fetches a reference answer corresponding to the matched question;
    provides, to the registered user, the reference answer corresponding to the matched question, wherein the question from the registered user, the plurality of security questions, and the reference answer are kept secret from the resource;

after the reference answer is provided to the registered user, receives a notification of acceptance of the call from the registered user; and following receipt of the notification of acceptance, starts a communication session between the registered user and the resource.

12. The system of claim 11, wherein the processor when executing the executable instructions:

accepts the plurality of security questions and a plurality of reference answers from the registered user during registration with the enterprise network.

13. The system of claim 11, wherein the plurality of security questions and the reference answer are stored in a media server associated with the enterprise network and wherein the media server is located in a separate authentication server that is separate from the enterprise network.

14. The system of claim 13, wherein the call is routed through the separate authentication server via a secured connection.

15. The system of claim 11, wherein the plurality of security questions and the reference answer are stored in a media server associated with the enterprise network and wherein the media server is located inside the enterprise network.

16. The system of claim 11, wherein the processor when executing the executable instructions:

stores additional information related to the registered user in a media server associated with the enterprise network.

17. The system of claim 11, wherein the processor when executing the executable instructions:

prior to receiving the question from the registered user, receives a request from the registered user to verify the authenticity of the resource placing the call.

18. The system of claim 11, wherein the processor when executing the executable instructions:

automatically routes the call to an agent authentication system upon receipt of the call by the registered user and prior to receiving the question from the registered user.

* * * * *